US012783146B1

(12) United States Patent
Wang et al.

(10) Patent No.: US 12,783,146 B1
(45) Date of Patent: Nov. 3, 2026

(54) DATA LIFECYCLE MANAGEMENT AND TUNING

(71) Applicant: INTERNATIONAL BUSINESS MACHINES CORPORATION, Armonk, NY (US)

(72) Inventors: Hui Wang, Beijing (CN); Mai Zeng, Shi Jing Shan (CN); Peng Hui Jiang, Beijing (CN); Jun Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/217,061

(22) Filed: May 23, 2025

(51) Int. Cl.
*G06F 12/00* (2006.01)
*G06F 3/06* (2006.01)

(52) U.S. Cl.
CPC .......... *G06F 3/0649* (2013.01); *G06F 3/0604* (2013.01); *G06F 3/0668* (2013.01)

(58) Field of Classification Search
CPC ..... G06F 3/0649; G06F 3/0604; G06F 3/0668
USPC .......................................................... 711/165
See application file for complete search history.

(56) References Cited

U.S. PATENT DOCUMENTS

2020/0242078 A1 7/2020 Dain et al.
2020/0304290 A1 9/2020 Coulmeau et al.
2023/0071455 A1 3/2023 Malkan et al.
2024/0020212 A1 1/2024 Andrews et al.

FOREIGN PATENT DOCUMENTS

CN 109218321 A * 1/2019 ......... H04L 63/1425
CN 110060144 A * 7/2019 ............. G06Q 40/03
CN 120011376 A * 5/2025 ............. G06F 16/27
CN 120123370 A * 6/2025 ......... G06F 21/6227

OTHER PUBLICATIONS

IBM, "Managing data sources for Lifecycle Query Engine", available online at <https://www.ibm.com/docs/en/engineering-lifecycle-management-suite/lifecycle-management/7.0.2?topic=administering-managing-data-sources-lqe>, Oct. 3, 2024, 2 pages.
International Searching Authority, "Notification of Transmittal of the International Search Report and the Written Opinion of the International Searching Authority, or Declaration," Patent Cooperation Treaty Jul. 20, 2026, 9 pages, International Application No.-PCT/EP2026/061435.
Pang Lu: "Intelligent Methods for Data Management: Prediction, Migration, and Generation", A Dissertation Submitted to the Temple University Graduate Board in Partial Fulfillment of the Requirements for the Degree of Doctor of Philosophy, May 1, 2023, pp. 1-162, XP093410421.

* cited by examiner

*Primary Examiner* — Mardochee Chery
(74) *Attorney, Agent, or Firm* — Seed Intellectual Property Law Group LLP

(57) ABSTRACT

A method, system, and computer program product configured to perform operations including: monitoring a data index to determine changes to data stored within the data index; collecting data features by extracting characteristics from raw data related to the monitored data index; training a lifecycle phase classification model to assign a first lifecycle phase classification to at least one data point of the data index; training a cluster model to cluster data points within a threshold distance of other data points; and moving at least one data point based on a lifecycle phase classification model output and a cluster model output.

20 Claims, 7 Drawing Sheets

600a

605

610a

615a

| | | Age | Change rate | Baseline gap | Time series fit | Alert | CTR | ... | Space left |
|---|---|---|---|---|---|---|---|---|---|
| Data source 1 | Field1 | 1d | 3% | 20% | | Y | 0.3 | | 40% |
| | Field2 | 2d | 7% | -10% | | N | 0.2 | | 40% |
| | ... | | | | | | | | |
| Data source 2 | Field1 | 3d | 100% | -12% | | N | 0.7 | | 40% |
| | Field2 | 10d | 20% | 10% | | N | 0.2 | | 40% |
| | ... | | | | | | | | |

FIG. 6A

600b

620

610b

615b

| | Current time:t0 Interval: Int | HOT | WARM | COLD | ... | DELETE |
|---|---|---|---|---|---|---|
| Data source 1 | t0-Int | X | | | | |
| | t0-2*Int | | X | | | |
| | ... | | | | | X |
| Data source 2 | t0-Int | X | | | | |
| | t0-2*Int | X | | X | | |
| | ... | | | | | |

FIG. 6B

DATA LIFECYCLE MANAGEMENT AND TUNING

BACKGROUND

Aspects of the present invention relate generally to intelligent data lifecycle policy management and tuning.

Data is accumulating at an unprecedented rate due to an increasing reliance on digital technology. Every time the internet is used, messages are sent, photos uploaded, videos streamed, or even websites browsed, data is generated. This data is stored in vast networks of servers (e.g., data centers), which process and manage information for businesses, governments, and/or individuals.

As technology advances, the ability to collect, store, and process data is also improving. Devices such as smartphones, smart appliances, and/or artificial intelligence (AI)-powered systems continuously generate and store more data than ever before.

SUMMARY

In a first aspect of the invention, there is a method including: monitoring a data index to determine changes to data stored within the data index; collecting data features by extracting characteristics from raw data related to the monitored data index; training a lifecycle phase classification model to assign a first lifecycle phase classification to at least one data point of the data index; training a cluster model to cluster data points within a threshold distance of other data points; and moving at least one data point based on a lifecycle phase classification model output and a cluster model output.

In another aspect of the invention, there is a computer program product comprising one or more computer-readable storage media and program instructions stored on the one or more computer-readable storage media to perform operations comprising: monitoring a data index to determine changes to data stored within the data index; collecting data features by extracting characteristics from raw data related to the monitored data index; training a lifecycle phase classification model to assign a first lifecycle phase classification to at least one data point of the data index; training a cluster model to cluster data points within a threshold distance of other data points; and moving at least one data point based on a lifecycle phase classification model output and a cluster model output.

In another aspect of the invention, there is a computer system comprising a processor set, one or more computer-readable storage media, and program instructions stored on the one or more computer-readable storage media to cause the processor set to perform operations comprising: monitoring a data index to determine changes to data stored within the data index; collecting data features by extracting characteristics from raw data related to the monitored data index; training a lifecycle phase classification model to assign a first lifecycle phase classification to at least one data point of the data index; training a cluster model to cluster data points within a threshold distance of other data points; and moving at least one data point based on a lifecycle phase classification model output and a cluster model output.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 6A shows an exemplary feature map in accordance with aspects of the present invention.

FIG. 6B shows an exemplary lifecycle class map in accordance with aspects of the present invention.

DETAILED DESCRIPTION

Figure 1:
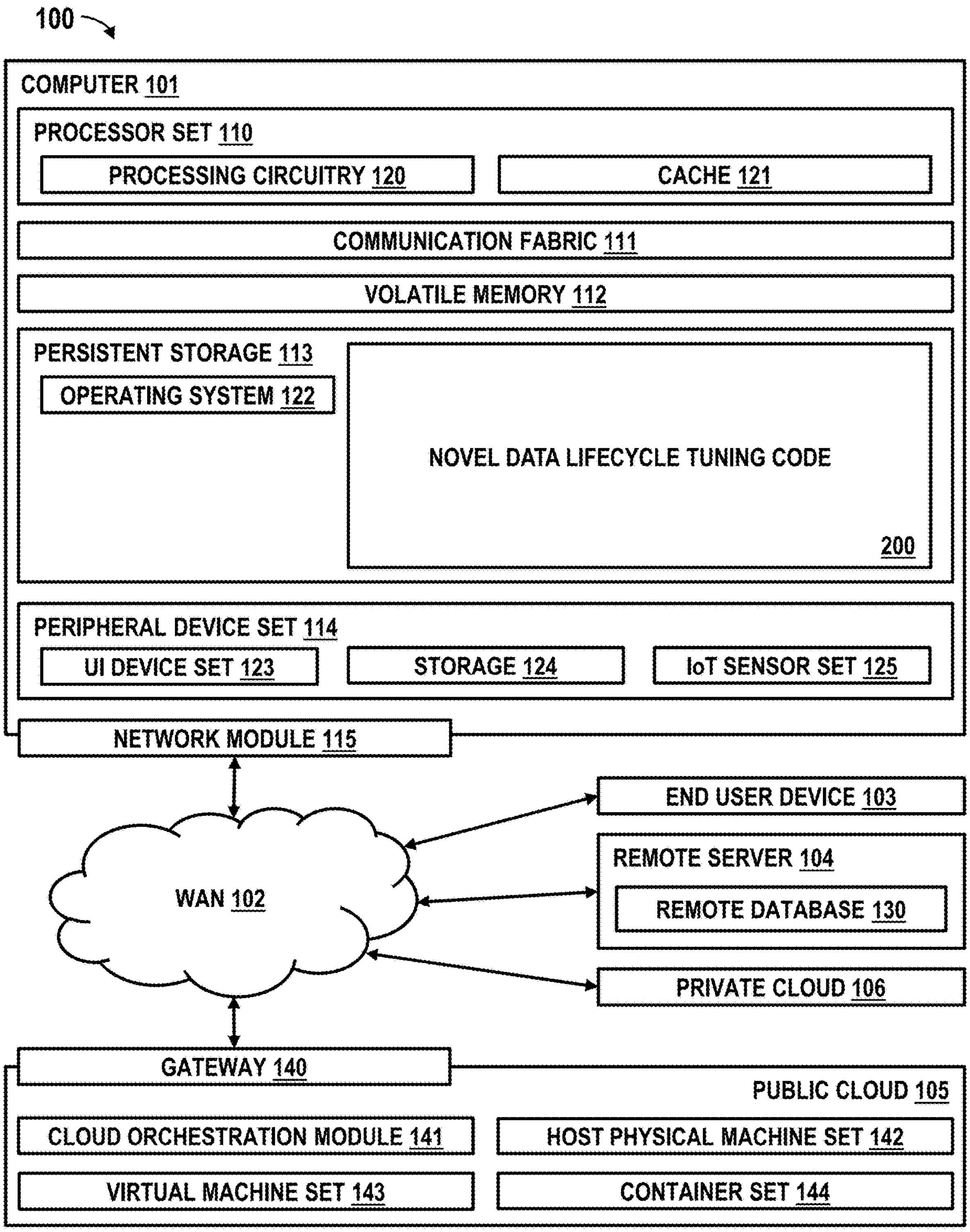
FIG. 1 depicts a computing environment according to an embodiment of the present invention.

Aspects of the present invention relate generally to intelligent data lifecycle policy management and tuning. Specifically, aspects of the present invention provide systems and methods for optimized movement (e.g., tuning) of data between different storage tiers (e.g., hot, warm, cold, delete) based on how frequently the data is used (e.g., queried, called, etc.). By accurately identifying the current lifecycle phase of each data point and/or index, frequently accessed data is kept on high-speed storage, infrequently accessed data is moved to cheaper, slower storage, and obsolete data is deleted. In embodiments, this leads to better use of limited high-performance storage, freeing up resources and reducing costs. Aspects of the present invention may further provide systems and methods for allowing customization and precision in how data lifecycle policies are applied. For example, decisions may be made based on real usage patterns and not static rules and may use machine learning models to track and/or determine when data becomes more relevant, less relevant, and/or no longer needed.

When large volumes of data are continuously ingested into an index, the associated overhead increases significantly. This growing overhead can lead to reduced efficiency in querying, as the system must process and manage an ever-expanding dataset. As a result, both indexing and retrieval operations may experience delays, negatively impacting overall system performance. Given the rapid pace of technological advancement and data generation, this trend is expected to continue. As data volumes scale, without effective management strategies, performance deterioration is inevitable. Known technologies are not equipped to scale efficiently with the exponential growth of data, leading to bottlenecks in storage, processing, and retrieval. Therefore, known systems suffer from the problem of maintaining performance across continuously expanding datasets.

Implementations of the invention address this problem by intelligently classifying data according to lifecycle phases and dynamically relocating data across storage tiers based on real-time usage patterns and predictive modeling. Specifically, aspects of the invention involve the use of machine learning techniques to analyze historical and evolving data characteristics, accurately assign lifecycle phases, and optimize data storage and retrieval accordingly. This improves the functioning of a computer by reducing unnecessary read/write operations, minimizing storage overhead, and maintaining consistent query performance even as data volume increases. It improves the technology of data lifecycle management and tuning by introducing adaptive, learning-based classification and storage optimization techniques that respond dynamically to changing data behaviors.

In accordance with aspects of the invention, a method, computer program product, and computer system are configured to perform operations comprising: monitoring a data index to determine changes to data stored within the data index; collecting data features by extracting characteristics from raw data related to the monitored data index; training a lifecycle phase classification model to assign a first lifecycle phase classification to at least one data point of the data index; training a cluster model to cluster data points within a threshold distance of (e.g., similar to) other data points; and moving at least one data point based on a lifecycle phase classification model output and a cluster model output. This method, computer program product, and computer system improve the functioning of a computer by reducing unnecessary read/write operations, minimizing storage overhead, and maintaining consistent query performance even as data volume increases. This method, computer program product, and computer system improve the technology of data lifecycle management and tuning by introducing adaptive, learning-based classification and storage optimization techniques that respond dynamically to changing data behaviors.

In embodiments of the method, computer program product, and computer system, the lifecycle phase classification model output is determined by plotting a curve of the collected data features using linear regression. This curve, which may be referred to as phase classification curve, advantageously enables improved accuracy in classifying the data during a lifecycle phase evaluation.

In embodiments of the method, computer program product, and computer system, the moving the at least one data point comprises deleting the at least one data point from a memory. In this manner, based on determining the data index is no longer needed and can safely be removed, implementations may delete the data from all memory, which advantageously ensures efficient storage management and cost reduction.

In embodiments of the method, computer program product, and computer system, the lifecycle phase classification model output is the first lifecycle phase classification for the at least one data point and the cluster model output is a second lifecycle phase classification for the at least one data point. In various embodiments, when the data points are related and/or share common characteristics, the data points are clustered into groups or segments that represent different lifecycle phases, which provides the advantage of enabling automated classification and lifecycle tuning based on their behavioral similarities.

In embodiments of the method, computer program product, and computer system, the operations further comprise determining the lifecycle phase classification of the at least one data point is an earlier phase of the lifecycle phase classification model output and a cluster model output. In this manner, if the phase results are different for the classification model and the cluster model result, implementations use the one with earlier phase, which provides the advantage or preserving the data in the earlier phase and avoiding prematurely moving the data to the later phase.

In embodiments of the method, computer program product, and computer system, the first lifecycle phase classification and the second lifecycle phase classification are a same phase classification. In embodiments, if the lifecycle phase of the data point and/or the data index is the same as the lifecycle phase of the data points within the related cluster of data points, then nothing changes, which provides improved accuracy of the classification.

In embodiments of the method, computer program product, and computer system, the extracting characteristics from raw data comprises filtering and normalizing the raw data to extract the characteristics. In embodiments, feature selection, normalization, and/or dimensionality reduction techniques may be used to optimize model performance. For example, in embodiments, filtering in the form of feature selection may be used to retain relevant attributes from the historical data feature set, thereby improving clustering accuracy and reducing computational complexity. In embodiments, normalization can be applied to scale data features to a uniform range, thereby providing the advantage of ensuring that attributes with different units and/or magnitudes do not disproportionately affect the clustering process.

It should be understood that, to the extent implementations of the present invention collect, store, or employ personal information provided by, or obtained from, individuals (e.g., personal data stored in the data points and/or data indexes that may be monitored and extracted), such information may be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner that at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as novel data lifecycle tuning code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
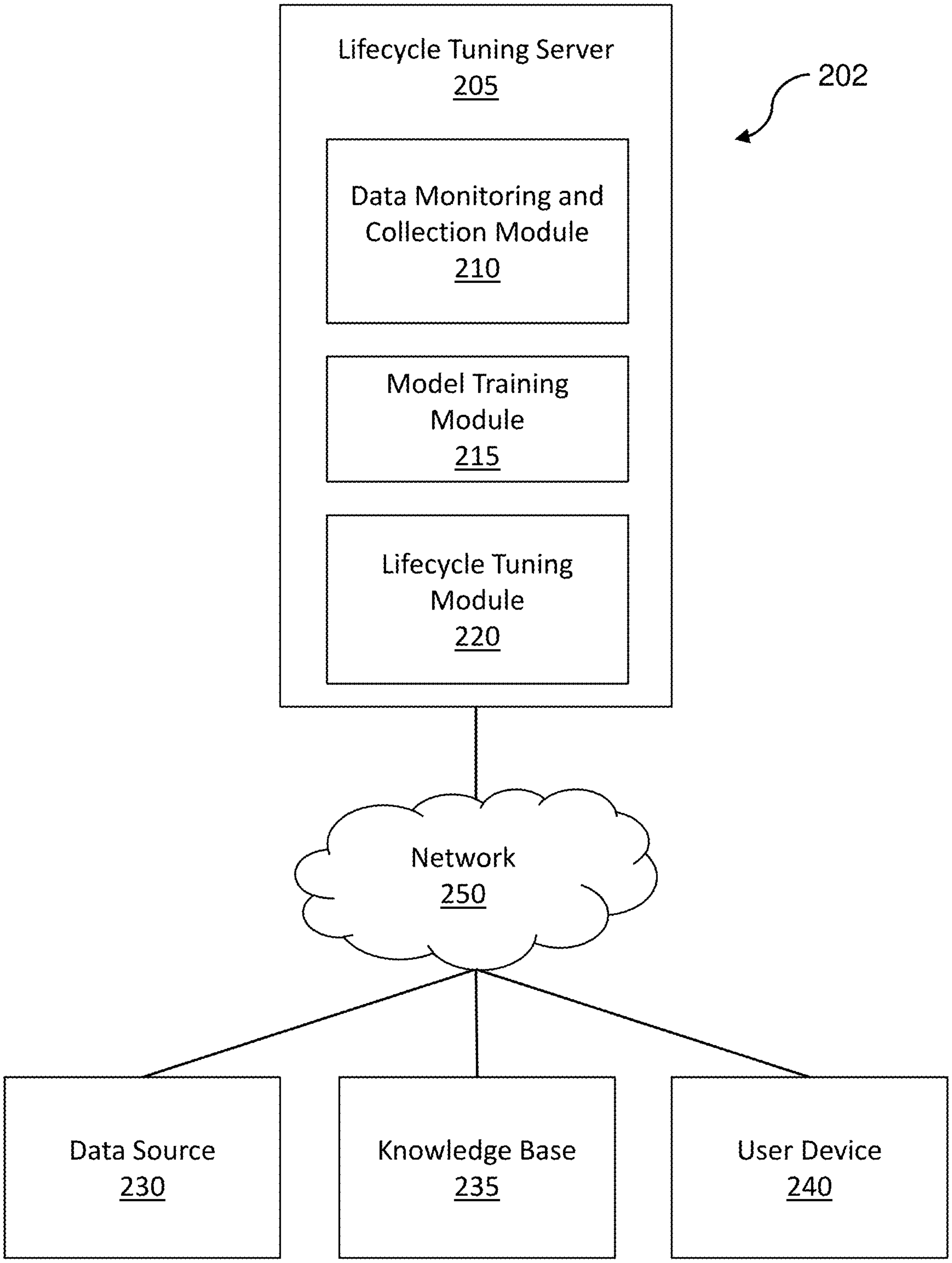
FIG. 2 shows a block diagram of an exemplary environment in accordance with aspects of the present invention.

FIG. 2 shows a block diagram of exemplary environment 202 in accordance with aspects of the present invention. In embodiments, environment 202 includes lifecycle tuning server 205, data source 230, knowledge base 235, user device 240, and network 250.

Lifecycle tuning server 205 may comprise one or more instances of computer 101 of FIG. 1. In another example lifecycle tuning server 205 may comprise one or more virtual machines or containers running on one or more instances of computer 101 of FIG. 1. In embodiments, lifecycle tuning server 205 communicates with data source 230 and user device 240 via network 250, which may comprise WAN 102 of FIG. 1. In embodiments, data source 230 may comprise one or more data sources each comprising an instance of remote database 130 and/or remote server 104 of FIG. 1. In embodiments, user device 240 comprises an instance of EUD 103 of FIG. 1. There may be plural different instances of user device 240 including, for example, personal computing devices or any other device capable of using and rendering a dynamic shell history command. The different instances of user device 240 may be used by different users, programmers, evaluators, operators, technicians, etc.

In embodiments, lifecycle tuning server 205 of FIG. 2 comprises data monitoring and collection module 210, model training module 215, and lifecycle tuning module 220, each of which may comprise modules of the code of block 200 of FIG. 1. Such modules may include routines, programs, objects, components, logic, data structures, and so on that perform a particular task (or tasks) or implement a particular data type (or types) that the code of block 200 uses to carry out the functions and/or methodologies of embodiments of the present invention as described herein. These modules of the code of block 200 are executable by computer 101 of FIG. 1 (e.g., processing circuitry 120 of FIG. 1) to perform the inventive methods as described herein. lifecycle tuning server 205 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the present invention, lifecycle tuning server 205 is configured to facilitate communication between data monitoring and collection module 210, model training module 215, lifecycle tuning module 220, and external storage (e.g., data source 230 and/or knowledge base 235) and devices (e.g., user device 240) via network 250.

In embodiments, lifecycle tuning server 205 may be configured to receive, access, and/or obtain at least one data index stored locally and/or at external data sources. In embodiments, the data may be received, accessed, and/or obtained from a data source (e.g., data source 230 and/or knowledge base 235) and/or a user device (e.g., user device 240) over a network (e.g., network 250). As used herein, a data index refers to structured reference and/or catalog that organizes, stores, and enables efficient retrieval of data entries from various sources. The data index may be stored with the data or may be stored separately from the data and associated with the data. In embodiments, the data index maps data attributes, such as timestamps, classifications, metadata, and/or other data, to their corresponding locations (e.g., in a database and/or memory), facilitating optimized search, analysis, and lifecycle management within the system. For example, in an exemplary information technology (IT) monitoring system, a data index might store an index ID, timestamp, metric, value, status, etc. In this example, if the status was labeled "high usage," if a user searched for "high-CPU usage events," instead of searching through hundreds of thousands of log entries, the system can use the data index to quickly find the entries having the status of "high usage." In this manner, data indexes enhance search efficiency, improve data retrieval speed, reduce computational overhead, and/or optimize the organization and management of large datasets within the system.

In embodiments, the received, accessed, and/or obtained data my include IT operational data. As used herein, IT operational data refers to IT operational data refers to data generated, collected, and/or monitored during the operation and performance of information technology systems, services, and/or infrastructure. In embodiments, this data may include, but is not limited to, system logs, application logs, CPU usage, memory utilization, network activity, storage metrics, error messages, process execution traces, user activity records, and more. In embodiments, IT operational data may provide insights into the health, performance, security, and/or availability of IT environments. Accordingly, the IT operational data may be useful for enabling proactive monitoring, diagnostics, alerting, and/or lifecycle analysis.

In accordance with aspects of the present invention, data monitoring and collection module 210 may be configured to monitor the data index to determine changes to data stored within the data index. In embodiments, monitoring includes tracking updates, modifications, deletions, queries, and/or additions to the indexed data. In embodiments, data monitoring and collection module 210 may further detect patterns, anomalies, and/or trends as they occur in real-time. In embodiments, data monitoring and collection module 210 monitors the data index using an automated software agent, a machine learning algorithm, and/or a rule-based script, each of which continuously scans the data index for changes.

In embodiments, data monitoring and collection module 210 is configured to generate and/or collect a data feature based on the monitoring by extracting characteristics and/or attributes from raw data related to the monitored data index. As used herein, a data feature refers to a measurable characteristic, attribute, and/or derived value extracted from raw data related to the monitored data index. In embodiments, data features may be used for analysis, classification, pattern recognition, and/or data-retention decision-making. In embodiments, data features may include statistical metrics, temporal trends, categorical labels, anomaly indicators, and/or any other transformed representation of the raw data that might enhance or describe data searching and/or data retrieval characteristics. In embodiments, the characteristics and/or attributes are extracted from the raw data by applying one or more data processing techniques, such as filtering (i.e., extract specific features), normalizing (i.e., scale and/or transform raw data into a standard format and/or range), feature engineering (i.e., selecting, transforming, and/or creating relevant data features from raw data), and/or any other process for extracting data features from raw data including machine learning techniques such as a decision tree algorithm, support vector machine algorithms, neural networks, and more.

In embodiments, data monitoring and collection module 210 is configured to store the data feature as historical data feature data. In embodiments, data monitoring and collection module 210 stores the historical data feature data locally. In other embodiments, the historical data feature data is stored at an external storage (e.g., data source 230 and/or knowledge base 235). In embodiments, the historical data feature data may also (or alternatively) be sent to a user device (e.g., user device 240).

In accordance with aspects of the present invention, model training module 215 may be configured to train and/or re-train a lifecycle phase classification model to analyze the historical data and assign a lifecycle phase classification to a data point of the data index and/or the data index using the trained lifecycle phase classification model. In embodiments, the lifecycle phase classification model is trained by utilizing historical data feature sets to identify patterns and/or trends that correspond to different lifecycle phases. This process may involve supervised learning techniques (e.g., decision trees, random forests, and/or neural networks), where labeled historical data is used to train the model. In embodiments, the lifecycle phase classification model may incorporate reinforcement learning strategies to continuously adjust classifications based on evolving data usage patterns.

In embodiments, the assigned lifecycle phase classification is hot, warm, cold, or delete. A hot phase may indicate, for example, that a data index is actively being updated and queried and may use a high-performance storage. A warm phase may indicate, for example, that the data index is no longer being updated but is still being queried or the data index is being updated but is no longer being queried. In embodiments, a warm data index may be moved to a lower-cost storage while maintaining a specific performance. A cold phase may indicate, for example, that the data index is no longer being updated and is seldom queried. In such embodiments, the information still needs to be searchable, but the queries may take longer due to the cold phase data index being moved to a lower-priority storage. A delete phase may indicate, for example, that the data index is no longer needed and can safely be removed, ensuring efficient storage management and cost reduction. In embodiments, a user (e.g., client, customer, entity, company, person) may determine the thresholds for each phase. For example, a user may configure thresholds based on query frequency, update activity, and/or data age to define when a data index transitions from hot to warm, warm to cold, and/or cold to delete. These thresholds may be tailored to align with business priorities, compliance requirements, and/or resource constraints, enabling lifecycle phase classification that reflects user-specific policies and operational needs.

In embodiments, model training module 215 may be configured to train and/or re-train a cluster model to analyze the historical data and determine whether the data point and/or the data index belong to a cluster of data points using the trained cluster model. In embodiments, each value of data in term of time series, and every data point is associated with one data index. In embodiments, the cluster model is trained by utilizing historical data feature data to identify patterns, relationships, and/or common characteristics among multiple data points. When the data points are related and/or share common characteristics, the data points are clustered into groups or segments that represent different lifecycle phases, enabling automated classification and lifecycle tuning based on their behavioral similarities.

In embodiments, the training and/or re-training may be performed by applying unsupervised learning techniques (e.g., k-means clustering, hierarchical clustering, and/or density-based spatial clustering of applications with noise (DBSCAN)), to group similar data points based on extracted features. In embodiments, feature selection, normalization, and/or dimensionality reduction techniques may be used to optimize model performance. For example, in embodiments, feature selection may be used to retain relevant attributes from the historical data feature set, thereby improving clustering accuracy and reducing computational complexity. In embodiments, normalization can be applied to scale data features to a uniform range, thereby ensuring that attributes with different units and/or magnitudes do not disproportionately affect the clustering process. In embodiments, dimensionality reduction techniques (e.g., principal component analysis (PCA) and/or t-distributed stochastic neighbor embedding (t-SNE)) may be employed to reduce the number of features while preserving relevant patterns, thereby making clustering more efficient and interpretable.

In embodiments, model training module 215 compares the lifecycle phase of the data point and/or the data index with the data points within the related cluster of data points. If the lifecycle phase of the data point and/or the data index is the same as the lifecycle phase of the data points within the related cluster of data points, nothing changes. However, if the lifecycle phase of the data point and/or the data index is the not the same as (i.e., is different from) the lifecycle phase of the data points within the related cluster of data points, model training module 215 is configured to determine whether the lifecycle phase classification of the data point and/or the data index occurs earlier in time than the lifecycle phase of the data points within the related cluster of data points.

In embodiments, if the lifecycle phase classification of the data point and/or the data index occurs earlier in time than the lifecycle phase of the data points within the related cluster of data points, then nothing changes. However, if the lifecycle phase classification of the data point and/or the data index occurs later in time than the lifecycle phase of the data points within the related cluster of data points, then model training module 215 is configured to update the lifecycle phase classification of the data point and/or the data index to match (e.g., be the same as) the lifecycle phase of the data points within the related cluster of data points. For example, in embodiments, if the lifecycle phase model assigns a data point to the "cold" phase and the cluster model determines that the data point should be clustered with other data points within the "cold" phase, then the data point retains the cold phase designation. In another example, in embodiments, if the lifecycle phase model assigns a data point to the "cold" phase and the cluster model determines that the data point should be clustered with other data points within the "warm" phase, the phase of the data point is updated to match the other data points within the cluster, meaning, the phase of the data point is updated to be the "warm" phase, because the warm phase comes earlier in time than the cold phase.

In accordance with aspects of the present invention, lifecycle tuning module 220 is configured to move the data point and/or the data index according to the assigned and/or determined lifecycle phase. For example, in embodiments, a data index that is actively being updated and queried should be stored in a high-performance storage (e.g., non-volatile memory express, solid state drives, random access memory, etc.). In such embodiments, a warm data index should be stored in mid-tier storage that balances performance and cost (e.g., hybrid storage arrays, storage area networks, network attached storage, etc.). In embodiments, a cold data index is an index that is no longer being updated and is seldom queried. While cold data indexes still need to be searchable, the queries can take longer. Therefore, cold data should be stored in a low-cost, high-capacity archival storage (e.g. tape drive, hard disk drives, cloud storage, etc.). A data index that is in the delete phase may be safely removed from all storage. Accordingly, in embodiments, lifecycle tuning module 220 moves the data point and/or data index to the appropriate storage. In this manner, the system optimizes storage resource usage, reduces operational costs, and maintains performance levels appropriate to data access patterns and lifecycle phases associated with the data points and/or data indexes. Thereby improving the functioning of a computer by dynamically allocating data to storage media best suited for its current usage characteristics, reducing latency for frequently accessed data, conserving high-performance resources, and minimizing unnecessary processing overhead.

Figure 3:
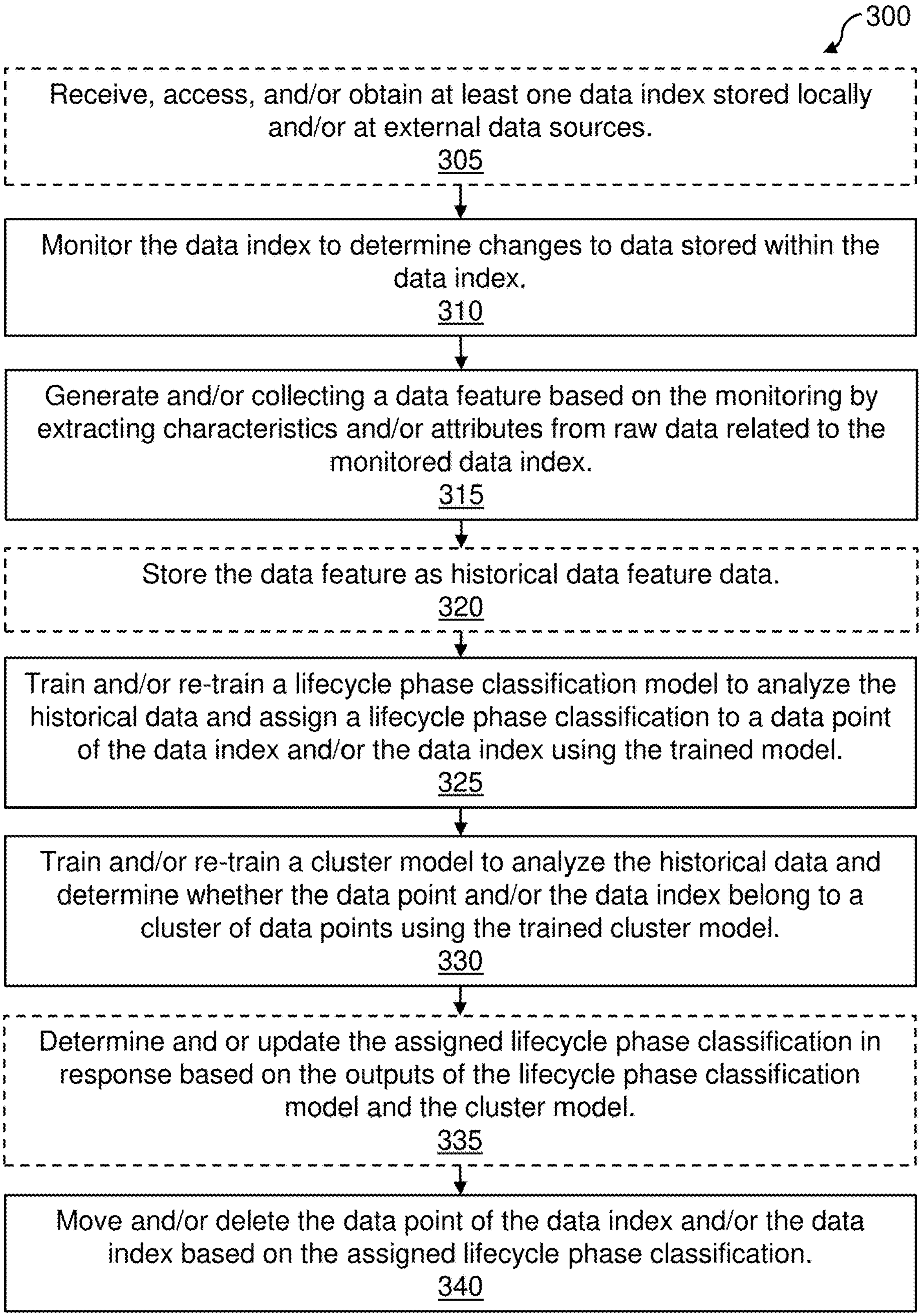
FIG. 3 shows a flowchart of an exemplary method in accordance with aspects of the present invention.

FIG. 3 shows a flow diagram of an exemplary method 300 in accordance with aspects of the present invention. Operations of the method 300 are described with reference to elements and actions depicted in and described with reference to FIG. 2.

At operation 305, the system (e.g., lifecycle tuning server 205 of FIG. 2) is optionally configured (as indicated by the dotted line) to receive, access, and/or obtain at least one data index stored locally and/or at external data sources In embodiments, the data may be received, accessed, and/or obtained from a data source (e.g., data source 230 and/or knowledge base 235) and/or a user device (e.g., user device 240) over a network (e.g., network 250). Operation 305 may be performed in accordance with the descriptions and embodiments of lifecycle tuning server 205 of FIG. 2.

At operation 310, the system (e.g., data monitoring and collection module 210 and model training module 215 of FIG. 2) is configured to monitor the data index to determine changes to data stored within the data index (or data stored separately from its associated data index). In embodiments, operation 310 may be performed in accordance with the descriptions and embodiments of data monitoring and collection module 210 and model training module 215 of FIG. 2.

At operation 315, the system (e.g., data monitoring and collection module 210 of FIG. 2) is configured to generate and/or collect a data feature based on the monitoring by extracting characteristics and/or attributes from raw data related to the monitored data index. As provided above, a data feature refers to a measurable characteristic, attribute, and/or derived value extracted from raw data related to the monitored data index. In embodiments, data features may include statistical metrics, temporal trends, categorical labels, anomaly indicators, and/or any other transformed representation of the raw data that might enhance or describe data searching and/or data retrieval characteristics. Operation 315 may be performed in accordance with the descriptions and embodiments of data monitoring and collection module 210 and model training module 215 of FIG. 2.

At operation 320, the system (e.g., data monitoring and collection module 210 of FIG. 2) is configured to store the data feature as historical data feature data. As noted above, in embodiments, data monitoring and collection module 210 stores the historical data feature data locally. In other embodiments, the historical data feature data is stored at an external storage (e.g., data source 230 and/or knowledge base 235). In embodiments, the historical data feature data may also (or alternatively) be sent to a user device (e.g., user device 240). Operation 320 may be performed in accordance with the descriptions and embodiments of data monitoring and collection module 210 of FIG. 2.

At operation 325, the system (e.g., model training module 215 of FIG. 2) is configured to train and/or re-train a lifecycle phase classification model to analyze the historical data and assign a lifecycle phase classification to a data point of the data index and/or the data index using the trained lifecycle phase classification model. As noted above, in embodiments, the lifecycle phase classification model is trained by utilizing historical data feature sets to identify patterns and/or trends that correspond to different lifecycle phases. This process may involve supervised learning techniques (e.g., decision trees, random forests, and/or neural networks), where labeled historical data is used to train the model. In embodiments, the lifecycle phase classification model may incorporate reinforcement learning strategies to continuously adjust classifications based on evolving data usage patterns. In embodiments, the assigned lifecycle phase classification is hot, warm, cold, or delete. Operation 325 may be performed in accordance with the description and embodiments of model training module 215 of FIG. 2.

At operation 330, the system (e.g., model training module 215 of FIG. 2) is configured to train and/or re-train a cluster model to analyze the historical data and determine whether the data point and/or the data index belong to a cluster of data points using the trained cluster model. As noted above, in embodiments, the cluster model is trained by utilizing historical data feature data to identify patterns, relationships, and/or common characteristics among multiple data points. In such embodiments, when the data points are related and/or share common characteristics, the data points are clustered into groups or segments that represent different lifecycle phases, enabling automated classification and lifecycle tuning based on their behavioral similarities. Operation 330 may be performed in accordance with the description and embodiments of model training module 215 of FIG. 2.

At operation 335, the system (e.g., model training module 215 of FIG. 2) is optionally configured to update the assigned lifecycle phase classification in response to determining that the assigned lifecycle phase does not match the lifecycle phase of other data points in the cluster. As noted above, in embodiments, model training module 215 compares the lifecycle phase of the data point and/or the data index with the data points within the related cluster of data points. If the lifecycle phase of the data point and/or the data index is the same as the lifecycle phase of the data points within the related cluster of data points, nothing changes. However, if the lifecycle phase of the data point and/or the data index is the not the same as (i.e., is different from) the lifecycle phase of the data points within the related cluster of data points, model training module 215 is configured to determine whether the lifecycle phase classification of the data point and/or the data index occurs earlier in time than the lifecycle phase of the data points within the related cluster of data points. In embodiments, if the lifecycle phase classification of the data point and/or the data index occurs earlier in time than the lifecycle phase of the data points within the related cluster of data points, nothing changes. However, if the lifecycle phase classification of the data point and/or the data index occurs later in time than the lifecycle phase of the data points within the related cluster of data points, model training module 215 is configured to update the lifecycle phase classification of the data point and/or the data index to match (e.g., be the same as) the lifecycle phase of the data points within the related cluster of data points. Operation 335 may be performed in accordance with the description and embodiments of model training module 215 of FIG. 2.

At operation 340, the system (e.g., lifecycle tuning module 220 of FIG. 2) is configured to move the data point and/or the data index according to the assigned and/or determined lifecycle phase. In one example, the system moves the data point or data index to the next life cycle, such as active, archived, inactive, deleted. Accordingly, at operation 340, the system may delete the data point and/or the data index based on the assigned lifecycle phase classification. Operation 340 may be performed in accordance with the description and embodiments of lifecycle tuning module 220 of FIG. 2.

Figure 4:
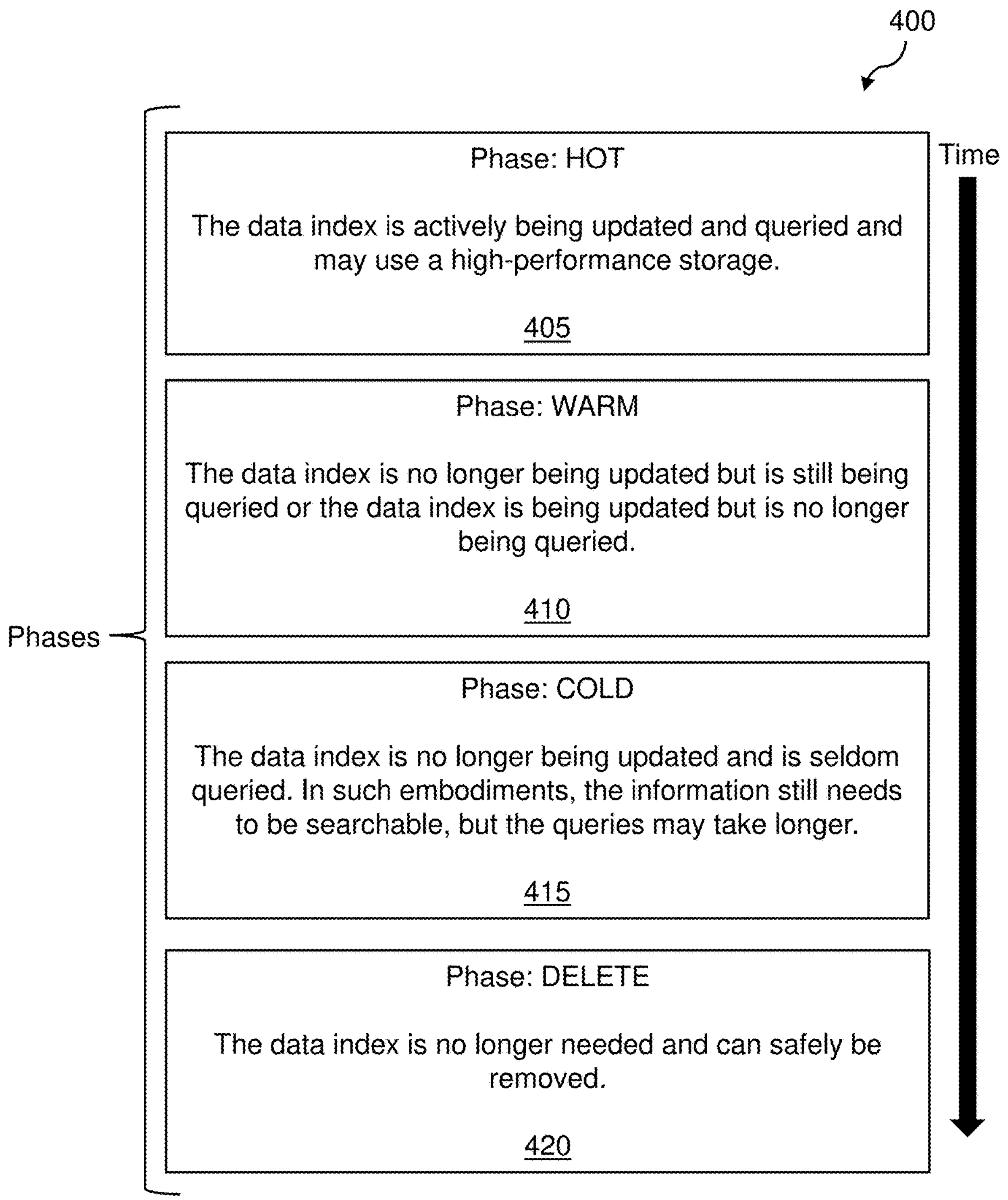
FIG. 4 shows a flow diagram of an exemplary method in accordance with aspects of the present invention.

FIG. 4 shows a flow diagram of an exemplary method 400 in accordance with aspects of the present invention. For example, method 400 illustrates a lifecycle of a data point and/or a data index over time. Phases of the method 400 are described with reference to elements and actions depicted in and described with reference to FIGS. 2 and 3.

In embodiments, a data point and/or a data index may be assigned to hot phase 405 when the data index is actively being updated and queried and may use a high-performance storage. In time, when the data index is no longer being updated but is still being queried or when the data index is being updated but is no longer being queried, the data point and/or a data index may be assigned to warm phase 410. Later in time, when the data index is no longer being updated and is seldom queried, the data point and/or a data index may be assigned to cold phase 415. Finally, when the data index is no longer needed and can safely be removed, it may be assigned to delete phase 420.

In embodiments, method 400 may be carried out in accordance with operations 325-340 of FIG. 3 and/or in accordance with the descriptions and embodiments of model training module 215 and/or lifecycle tuning module 220 of FIG. 2.

Figure 5:
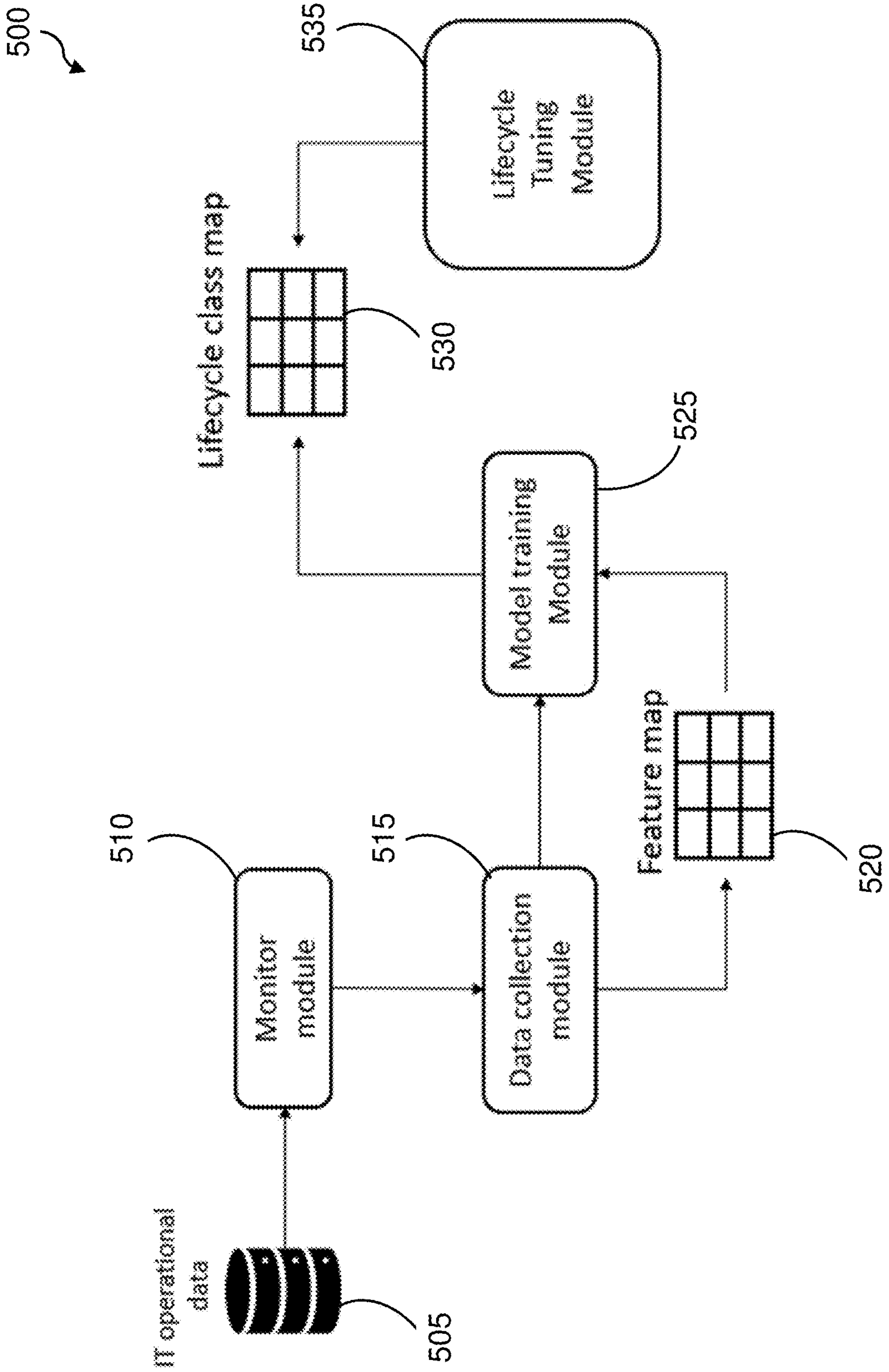
FIG. 5 shows a flowchart of an exemplary method in accordance with aspects of the present invention.

FIG. 5 shows a flowchart of an exemplary method 500 in accordance with aspects of the present invention. Operations of the method 500 are described with reference to elements and actions depicted in and described with reference to FIGS. 2 and 3.

At operation 510 a monitor module (e.g., data monitoring and collection module 210 of FIG. 2) receives IT operational data 505. In embodiments, the monitor module of operation 510 monitors IT operational data 505 (e.g., a data index) to determine changes to IT operational data 505 over time. In embodiments, monitoring may include tracking updates, modifications, deletions, queries, and/or additions to IT operational data 505. In embodiments, the monitor module of operation 510 may further detect patterns, anomalies, and/or trends as they occur in real-time. In embodiments, operation 510 may be carried out in accordance with operation 310 of FIG. 3 and/or in accordance with the descriptions and embodiments of data monitoring and collection module 210 of FIG. 2.

At operation 515 the data collection module (e.g., data monitoring and collection module 210 of FIG. 2) generates and collects data features from the raw IT operational data 505. In embodiments, the characteristics and/or attributes are extracted from the raw data by applying one or more data processing techniques, such as filtering, normalizing, feature engineering, and/or any other process for extracting data features from raw data. In embodiments, the generated and collected data features are stored at and/or within feature map 520 (e.g., a local memory and/or data source 230 of FIG. 2). In embodiments, operation 515 provides a structured and enriched representation of the raw IT operational data 505 that facilitates efficient analysis, classification, anomaly detection, model training, and/or decision-making processes. In embodiments, operation 515 may be carried out in accordance with operations 315-320 of FIG. 3 and/or in accordance with the descriptions and embodiments of data monitoring and collection module 210 of FIG. 2.

At operation 525 model training module (e.g., model training module 215 of FIG. 2) trains and/or re-trains a lifecycle phase classification model to analyze the historical data and assign a lifecycle phase classification to IT operational data 505 using the trained lifecycle phase classification model. Model training module of operation 525 further trains and/or re-trains a cluster model to analyze the historical data and determine whether the IT operational data 505 belongs to a cluster of data points using the trained cluster model. In embodiments, the results and/or outputs of the lifecycle phase classification model and/or the cluster model are stored at and/or within lifecycle class map 530 (e.g., a local memory and/or data source 230 of FIG. 2). In embodiments, operation 525 provides contextual tagging of IT operational data 505 that supports enhanced data organization, lifecycle management (e.g., tuning), trend analysis, and the identification of behavioral patterns across related data sets. In embodiments, operation 525 may be carried out in accordance with operations 325-330 of FIG. 3 and/or in accordance with the descriptions and embodiments of model training module 215 of FIG. 2.

In embodiments, the cluster model may classify multiple data sources as belonging or being related to various clusters, respectively. In such embodiments, the model training module of operation 525 uses the cluster model to provide cluster evaluation result for which data sources should belong to the same lifecycle phase. In embodiments, the cluster model may calculate a Euclidean distance using the following equation:

$$d(D_1, D_2) = \sqrt{\sum_{i=1}^{n} (x_{2i} - x_{1i})^2}$$

In other embodiments, the cluster model may use other vector distance calculation methods including Manhattan distance, cosine similarity, Minkowski distance, and more. Data points and/or data indexes that are close to one another (e.g., within a threshold distance) may be clustered within the same cluster and assigned the same phase classification. In this manner, the model training module groups related data sources based on similarity in feature space, enabling consistent and efficient lifecycle phase classification across clusters of similar data points and/or data indexes.

At operation 535 lifecycle tuning module (e.g., lifecycle tuning module 220 of FIG. 2) moves IT operational data 505 according to the assigned and/or determined lifecycle phase from operation 525 and as stored at and/or within lifecycle class map 530. In embodiments, this may include removing (e.g., deleting) IT operational data 505 from a memory. In embodiments, operation 535 may be carried out in accordance with operations 335-340 of FIG. 3 and/or in accordance with the descriptions and embodiments of lifecycle tuning module 220 of FIG. 2.

FIGS. 6A and 6B illustrate an exemplary use case in accordance with aspects of the present invention. FIG. 6A shows an exemplary feature map 600*a* in accordance with aspects of the present invention. Feature map 600*a* is described with reference to elements and actions depicted in and described with reference to FIG. 5.

FIG. 6A shows data features 605 (e.g., columns) describing data source 610*a* (e.g., data source 1) and data source 615*a* (e.g., data source 2). In embodiments, data features 605 represent data extracted from raw data (e.g., IT operational data 505 of FIG. 5). As used herein, a data feature refers to a measurable characteristic, attribute, and/or derived value extracted from raw data related to the monitored data index. In embodiments, the data features 605 may be filtered, normalized, and/or engineered to facilitate efficient analysis, classification, anomaly detection, model training, and/or decision-making processes. As illustrated, the data features may include age (e.g., the elapsed time since the data was ingested), change rate (e.g., the percentage change in a metric between two time intervals), baseline gap (e.g., the deviation from a historical or expected baseline value), time series fit (e.g., an indication of how well the data conforms to a predictable temporal pattern), alert (e.g., a flag or signal indicating abnormal behavior and/or threshold violation), click through rate (CTR) (e.g., the frequency of queries or access requests made to the data source), space left (e.g., the remaining available storage capacity in the associated database), and more.

FIG. 6B shows an exemplary lifecycle class map 600*b* in accordance with aspects of the present invention. Lifecycle class map 600*b* is described with reference to elements and actions depicted in and described with reference to FIG. 5.

FIG. 6B shows lifecycle classification data 620 (e.g., columns) describing data source 610*b* (e.g., data source 1) and data source 615*b* (e.g., data source 2). In embodiments, lifecycle classification data 620 represents data assigned by model training module of FIG. 5. For example, FIG. 6B shows that data source 610*b* is classified as being in the hot phase at t0-int. The same data source is classified as being in the warm phase at t0-2*int and at a later interval data source 610*b* is classified as being in the delete phase. FIG. 6B further shows that data source 615*b* is classified as being in the warm phase at t0-int. At t0-2*int, FIG. 6B shows that a lifecycle phase classification model has classified data source 615*b* as being in the cold phase, however, the cluster model has determined that data source 615*b* is clustered with data that is classified in the hot phase. Therefore, at t0-2*int, data source 615*b* is treated as being in the hot phase.

Figure 7:
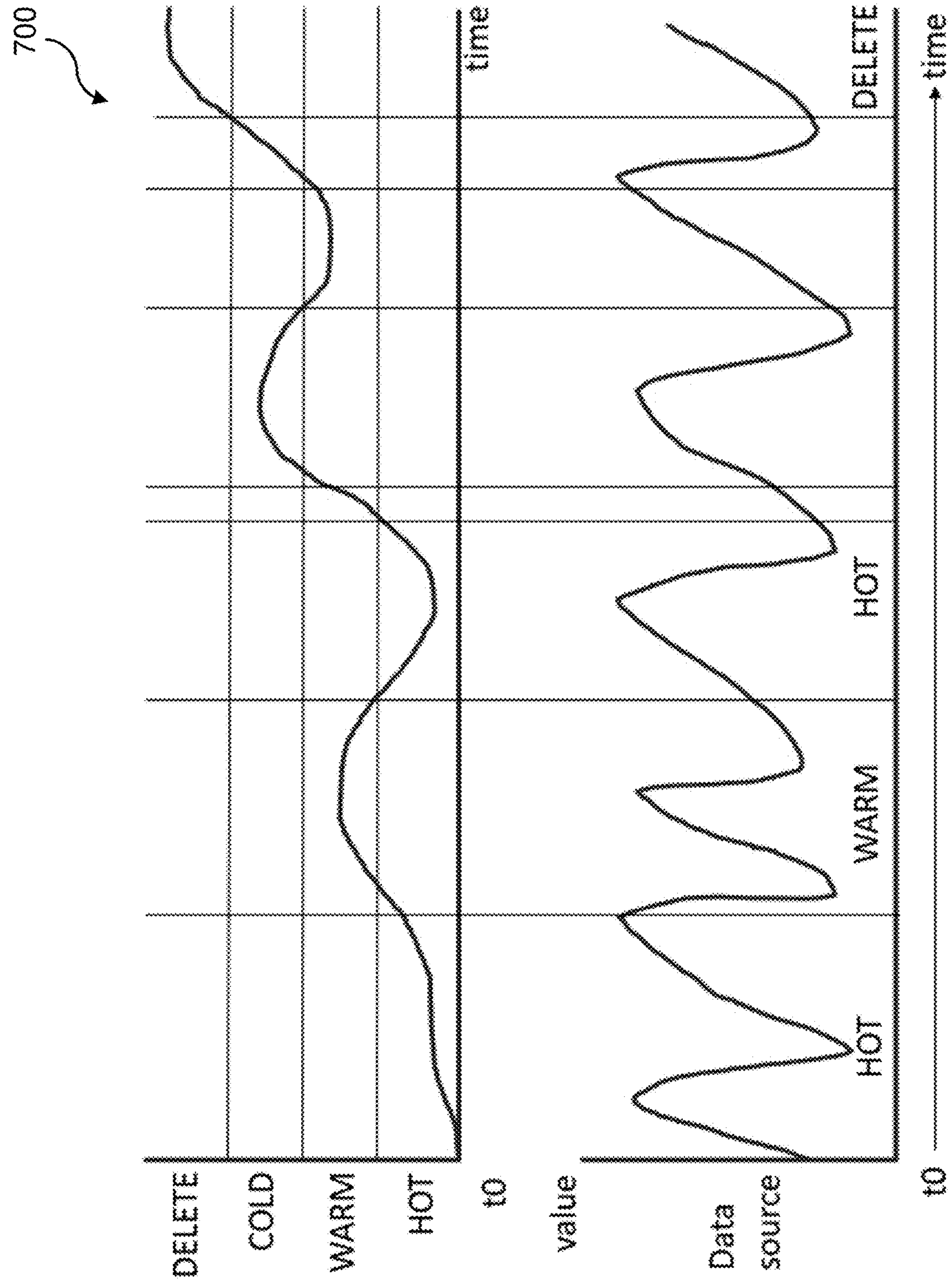
FIG. 7 shows an exemplary phase classification curve in accordance with aspects of the present invention

FIG. 7 shows an exemplary phase classification curve 700 in accordance with aspects of the present invention. Phase classification curve 700 is described with reference to elements and actions depicted in and described with reference to FIGS. 2-5. In embodiments, model training module 215 of FIG. 2 is configured to create and/or train a polynomial regression model to describe a data density curve which provides a lifecycle phase evaluation result according to the feature maps (e.g., feature map 520 of FIG. 5 and/or feature map 600*a* of FIG. 6A). In embodiments, model training module 215 uses the following polynomial regression model to plot the data density curve:

$$y = \beta_0 + \beta_1 t + \beta_2 t^k + \ldots + \beta_n t^m + \epsilon$$

In the expression above, y represents the data density that changes with time and data features, $\beta_0$, $\beta_1$ . . . , $\beta_n$ are coefficients for the features and the corresponding powers of time, t represents a time variable, and k represents the power (or degree) of time for each feature. For each feature, this power could be linear (i.e., k=1) or higher (polynomial), depending on how time influences the density. E is the error term, representing the variance in the data that the model cannot explain. This enables dynamic modeling of feature behavior across time, allowing more accurate identification of lifecycle phases based on evolving data density patterns.

As used herein, data density refers to the measure of how concentrated or spread out data points are within a given space or set of features, typically representing the frequency, concentration, and/or intensity of data occurrences across different time intervals, conditions, and/or environments. Data density patterns refer to characteristic trends, structures, and/or regularities observed in the distribution of data over time or other features. These patterns may reveal insights into how data behaves over time, showing whether it exhibits cyclic behaviors, trends (increasing, decreasing), irregularities, and/or other things.

As illustrated in FIG. 7, model training module 215 may plot the curve to determine and assign a lifecycle phase classification to a data source (e.g., a data point and/or a data index). In this manner, model training module 215 can accurately track and predict the evolution of data density over time, enabling more precise lifecycle phase assignments that reflect the dynamic nature of data usage and storage needs. In embodiments, this data may be used to tune (e.g., move) the data and optimize its storage allocation, ensuring that it resides in the most appropriate storage tier based on its evolving lifecycle phase and access patterns.

In embodiments, model training module 215 may also train a polynomial regression model to describe a data delete density curve inside the delete phase to determine when it is safe to delete the data from the memory. In embodiments, some data in delete phase may still have some (e.g., minimal) query rate and/or it may still be useful according to some data feature. Accordingly, model training module 215 may assign varying levels within the delete phase so that lifecycle tuning module 220 may know when it is safe to delete the data from memory. In embodiments, model training module 215 uses the following polynomial regression model to plot the data density curve:

$$y' = \beta_0 + \beta_1 t + \beta_2 t^k + \ldots + \beta_n t^m + \epsilon$$

In the expression above, y' represents the data density that changes with time and data features, $\beta_0$, $\beta_1$ . . . , $\beta_n$ are coefficients for the features and the corresponding powers of time, t represents a time variable, and k represents the power (or degree) of time for each feature. For each feature, this power could be linear (i.e., k=1) or higher (polynomial), depending on how time influences the density. E is the error term, representing the variance in the data that the model cannot explain. Model training module 215 may determine the varying levels of the delete phase by analyzing the rate of change in data density and query frequency, allowing it to identify thresholds at which data transitions from being minimally useful to no longer required, thereby guiding safe deletion decisions.

In embodiments, a service provider could offer to perform the processes described herein. In this case, the service provider can create, maintain, deploy, support, etc., the computer infrastructure that performs the process steps in accordance with aspects of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In additional embodiments, implementations provide a computer-implemented method, via a network. In this case, a computer infrastructure, such as computer 101 of FIG. 1, can be provided and one or more systems for performing the processes in accordance with aspects of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes in accordance with aspects of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

monitoring a data index to determine changes to data stored within the data index;

collecting data features by extracting characteristics from raw data related to the monitored data index;

training a lifecycle phase classification model to assign a first lifecycle phase classification to at least one data point of the data index;

training a cluster model to cluster data points within a threshold distance of other data points; and moving at least one data point based on a lifecycle phase classification model output and a cluster model output.

2. The method of claim 1, wherein the lifecycle phase classification model output is determined by plotting a curve of the collected data features using linear regression.

3. The method of claim 1, wherein the moving the at least one data point comprises deleting the at least one data point from a memory.

4. The method of claim 1, wherein the lifecycle phase classification model output is the first lifecycle phase classification for the at least one data point and the cluster model output is a second lifecycle phase classification for the at least one data point.

5. The method of claim 4, further comprising determining the lifecycle phase classification of the at least one data point is an earlier phase of the lifecycle phase classification model output and a cluster model output.

6. The method of claim 4, wherein the first lifecycle phase classification and the second lifecycle phase classification are a same phase classification.

7. The method of claim 1, wherein the extracting characteristics from raw data comprises filtering and normalizing the raw data to extract the characteristics.

8. A computer program product comprising:

one or more computer-readable storage media; and program instructions stored on the one or more computer-readable storage media to perform operations comprising:

monitoring a data index to determine changes to data stored within the data index;

collecting data features by extracting characteristics from raw data related to the monitored data index;

training a lifecycle phase classification model to assign a first lifecycle phase classification to at least one data point of the data index;

training a cluster model to cluster data points within a threshold distance of other data points; and moving at least one data point based on a lifecycle phase classification model output and a cluster model output.

9. The computer program product of claim 8, wherein the lifecycle phase classification model output is determined by plotting a curve of the collected data features using linear regression.

10. The computer program product of claim 8, wherein the moving the at least one data point comprises deleting the at least one data point from a memory.

11. The computer program product of claim 8, wherein the lifecycle phase classification model output is the first lifecycle phase classification for the at least one data point and the cluster model output is a second lifecycle phase classification for the at least one data point.

12. The computer program product of claim 11, wherein the operations further comprise determining the lifecycle phase classification of the at least one data point is an earlier phase of the lifecycle phase classification model output and a cluster model output.

13. The computer program product of claim 11, wherein the first lifecycle phase classification and the second lifecycle phase classification are a same phase classification.

14. The computer program product of claim 8, wherein the extracting characteristics from raw data comprises filtering and normalizing the raw data to extract the characteristics.

15. A computer system comprising:

a processor set;

one or more computer-readable storage media; and program instructions stored on the one or more computer-readable storage media to cause the processor set to perform operations comprising:

monitoring a data index to determine changes to data stored within the data index;

collecting data features by extracting characteristics from raw data related to the monitored data index;

training a lifecycle phase classification model to assign a first lifecycle phase classification to at least one data point of the data index;

training a cluster model to cluster data points within a threshold distance of other data points; and moving at least one data point based on a lifecycle phase classification model output and a cluster model output.

16. The computer system of claim 15, wherein the lifecycle phase classification model output is determined by plotting a curve of the collected data features using linear regression.

17. The computer system of claim 15, wherein the moving the at least one data point comprises deleting the at least one data point from a memory.

18. The computer system of claim 15, wherein the lifecycle phase classification model output is the first lifecycle phase classification for the at least one data point and the cluster model output is a second lifecycle phase classification for the at least one data point.

19. The computer system of claim 18, wherein the operations further comprise determining the lifecycle phase classification of the at least one data point is an earlier phase of the lifecycle phase classification model output and a cluster model output.

20. The computer system of claim 18, wherein the first lifecycle phase classification and the second lifecycle phase classification are a same phase classification.

* * * * *